(12) United States Patent
Zhou et al.

(10) Patent No.: US 10,110,330 B1
(45) Date of Patent: *Oct. 23, 2018

(54) RELAY SYSTEM CALIBRATION FOR WIRELESS COMMUNICATIONS BETWEEN A HEAD-MOUNTED DISPLAY AND A CONSOLE

(71) Applicant: Oculus VR, LLC, Menlo Park, CA (US)

(72) Inventors: Hongyu Zhou, Canoga Park, CA (US); Qi Qu, Irvine, CA (US); Ganesh Venkatraman, San Jose, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,436

(22) Filed: Mar. 9, 2018

Related U.S. Application Data

(63) Continuation of application No. 15/492,821, filed on Apr. 20, 2017, now Pat. No. 9,948,413.

(51) Int. Cl.
*H04B 7/185* (2006.01)
*H04B 17/309* (2015.01)
*H04B 7/06* (2006.01)
*H04B 7/0417* (2017.01)

(52) U.S. Cl.
CPC ......... *H04B 17/309* (2015.01); *H04B 7/0417* (2013.01); *H04B 7/0619* (2013.01)

(58) Field of Classification Search
None
See application file for complete search history.

(56) References Cited

U.S. PATENT DOCUMENTS

| | | | | |
|---|---|---|---|---|
| 7,577,398 | B2 * | 8/2009 | Judd | G01S 19/25 342/357.48 |
| 7,606,531 | B2 * | 10/2009 | Asai | H04B 7/1555 342/352 |
| 8,073,387 | B2 * | 12/2011 | Maslennikov | H04B 7/15578 455/11.1 |
| 8,121,077 | B2 * | 2/2012 | Yoshida | H04B 7/155 370/328 |
| 8,285,201 | B2 * | 10/2012 | Gore | H04B 7/15535 370/310 |
| 8,385,818 | B2 * | 2/2013 | Gore | H04B 7/15535 370/310 |

(Continued)

*Primary Examiner* — Tuan A Tran
(74) *Attorney, Agent, or Firm* — Fenwick & West LLP

(57) ABSTRACT

A head-mounted display (HMD) is wirelessly coupled to a console or a relay depending on the relative positions of the HMD, the console, and the relay. The HMD communicates wirelessly with the console using a narrow beam that is oriented in a particular direction. As the position of the HMD changes, the quality of the communication link between the HMD and the console may degrades. In response to the degradation, the HMD forms a communication link with a relay, which operates as an intermediary between the HMD and the console. The relay communicates with the HMD over a dedicated communication channel that is isolated from the communication channel over which the relay communicates with the console. A calibration module in the relay iteratively adjusts a noise reduction parameter until the effects of the undesirable feedback are eliminated.

20 Claims, 8 Drawing Sheets

(56) References Cited

U.S. PATENT DOCUMENTS

| | | | | |
|---|---|---|---|---|
| 8,666,309 B2* | 3/2014 | Hottinen | ............... | H04B 7/022 370/315 |
| 8,849,186 B2* | 9/2014 | Gore | .................... | H04B 1/525 370/310 |
| 8,976,690 B2* | 3/2015 | Akyildiz | ............ | H04L 41/5025 370/252 |
| 2010/0304666 A1* | 12/2010 | Hottinen | ............... | H04B 7/022 455/7 |
| 2013/0077556 A1* | 3/2013 | Gore | ................ | H04B 7/15578 370/315 |

* cited by examiner

US 10,110,330 B1

RELAY SYSTEM CALIBRATION FOR WIRELESS COMMUNICATIONS BETWEEN A HEAD-MOUNTED DISPLAY AND A CONSOLE

CROSS REFERENCE TO RELATED APPLICATIONS

This application is a continuation of co-pending U.S. application Ser. No. 15/492,821, filed Apr. 20, 2017, which is incorporated by reference in its entirety.

BACKGROUND

The present disclosure generally relates to virtual and augmented reality systems, and specifically relates to a relay system calibration for wireless communications between a head-mounted display and a console.

It is desirable to establish a reliable and fast wireless communication between a console and a head-mounted display (HMD) in a virtual reality (VR) system, an augmented reality (AR) system, a mixed reality (MR) system, or some combination thereof, to, e.g., "cut the cord" between the console and the HMD. A wireless communication based on extremely high carrier frequencies, such as communication based on 60 GHz carrier frequency in accordance with the IEEE 802.11ad standard or the IEEE 802.11ay standard represents a promising technology for achieving reliable wireless experience in VR, AR and MR systems.

A base station (e.g., console) that wirelessly communicates with a client (e.g., HMD) based on 60 GHz carrier frequency employs beam forming to compensate for a path loss and maintain a quality of wireless link above a predetermined threshold value. In some scenarios, the range of the console is limited such that a high quality wireless link cannot be formed or maintained if the HMD moves out of range. Since many VR, AR, and MR systems rely on an experience where a wearer of the HMD can freely move in a large area, the loss or degraded quality of the wireless link makes for a choppy and undesirable user experience.

SUMMARY

Disclosed embodiments support a head-mounted display (HMD) that is wirelessly coupled to a console or a relay depending on the relative positions of the HMD, the console, and the relay. The HMD and the console may be part of a wireless virtual reality (VR) system, a wireless augmented reality (AR) system, a wireless mixed reality (MR) system, or some combination thereof. The HMD communicates wirelessly with the console using a narrow beam that is oriented in a particular direction. As the position of the HMD changes, the quality of the communication link between the HMD and the console may degrade. In response to the degradation, the HMD forms a communication link with a relay, which operates as an intermediary between the HMD and the console.

The relay includes a radio-frequency (RF) circuit that enables bi-directional receive, amplify, and forward functionality of data packets being transmitted between the console and the HMD. Further, the relay uses dual band or dual polarization for connecting and communicating with the console and the HMD. In particular, the relay connects with the console 104 via a first band or a first polarization and connects with the HMD via a second band or a second polarization. In one embodiment, the HMD uses the first band or a first polarization to connect with the console 104 when the relay is not in operation. When the relay is in operation, the HMD uses second band or second polarization to connect with the relay, and the relay uses the first band or the first polarization to connect with the console.

The relay includes two antenna arrays: one configured to communicate with the HMD and the other configured to communicate with the console. As a consequence of these antenna arrays being proximally located, there is undesirably feedback between the two antenna arrays. A calibration module in the relay iteratively adjusts a noise reduction parameter until the effects of the undesirable feedback are eliminated.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Disclosed embodiments support a head-mounted display (HMD) that is wirelessly coupled to a console or a relay depending on the relative positions of the HMD, the console, and the relay. The HMD and the console may be part of a wireless virtual reality (VR) system, a wireless augmented reality (AR) system, a wireless mixed reality (MR) system, or some combination thereof. The HMD communicates wirelessly with the console using a narrow beam that is oriented in a particular direction. As the position of the HMD changes, the quality of the communication link between the HMD and the console may degrade. In response to the degradation, the HMD forms a communication link with a relay, which operates as an intermediary between the HMD and the console.

Figure 1:
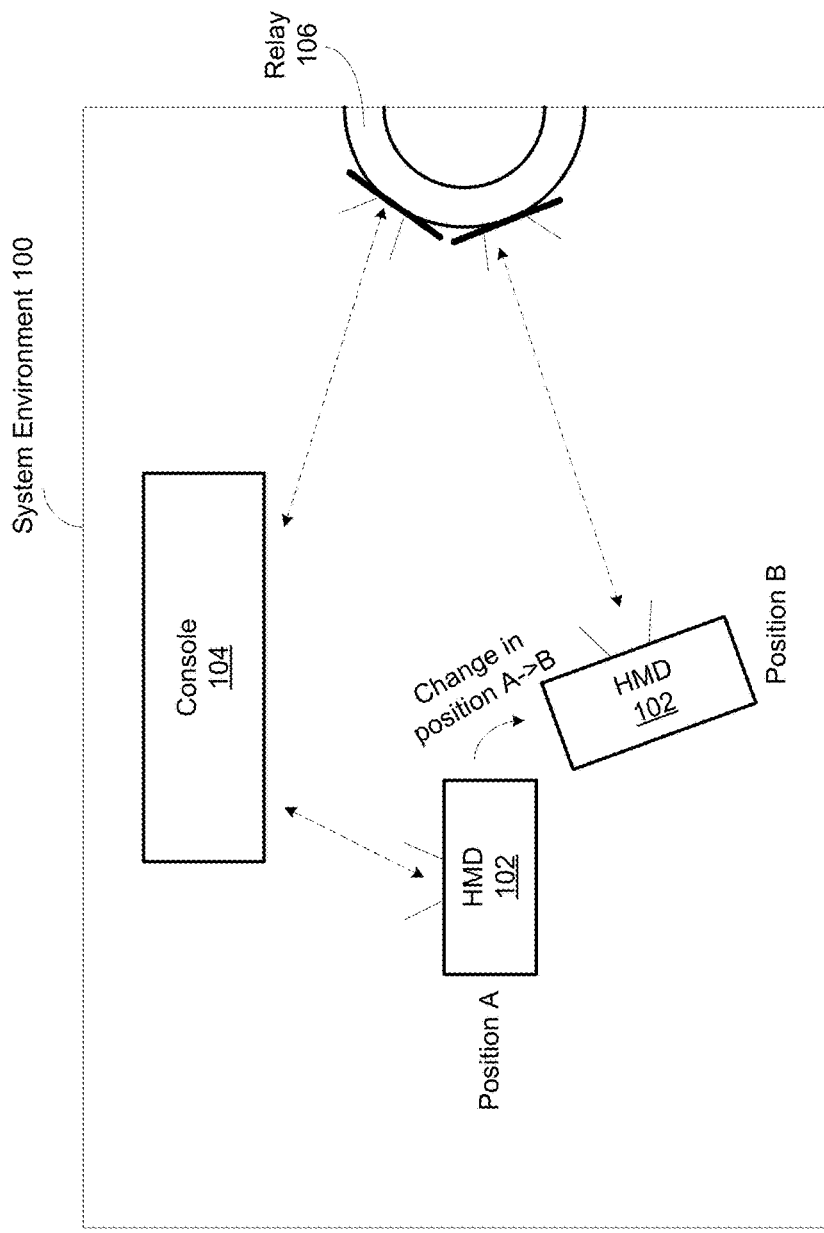
FIG. 1 is a system environment including a head-mounted display (HMD), a console, and a relay, in accordance with an embodiment.

FIG. 1 is a system environment 100 including a head-mounted display (HMD) 102, a console 104, and a relay 106, in accordance with an embodiment. The system environment 100 may be a VR system environment, an AR system environment, a MR system environment, or some combination thereof. While FIG. 1 shows one HMD 102 and one relay 106, in other embodiments any number of these components may be included in the system environment 100. For example, there may be multiple HMDs 102 that each communicate with the console 104. Additionally, functionality described in conjunction with one or more of the components shown in FIG. 1 may be distributed among the components in a different manner than described in conjunction with FIG. 1 in some embodiments. For example, some or all of the functionality of the console 104 is provided by the HMD 102.

The HMD 102 is a head-mounted display that presents content to a user comprising virtual and/or augmented views of a physical, real-world environment with computer-generated elements (e.g., 2D or 3D images, 2D or 3D video, sound, etc.). In some embodiments, the presented content includes audio that is presented via an external device (e.g., speakers and/or headphones) that receives audio information from the HMD 102, the console 104, or both, and presents audio data based on the audio information. The HMD 102 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

Figure 2:
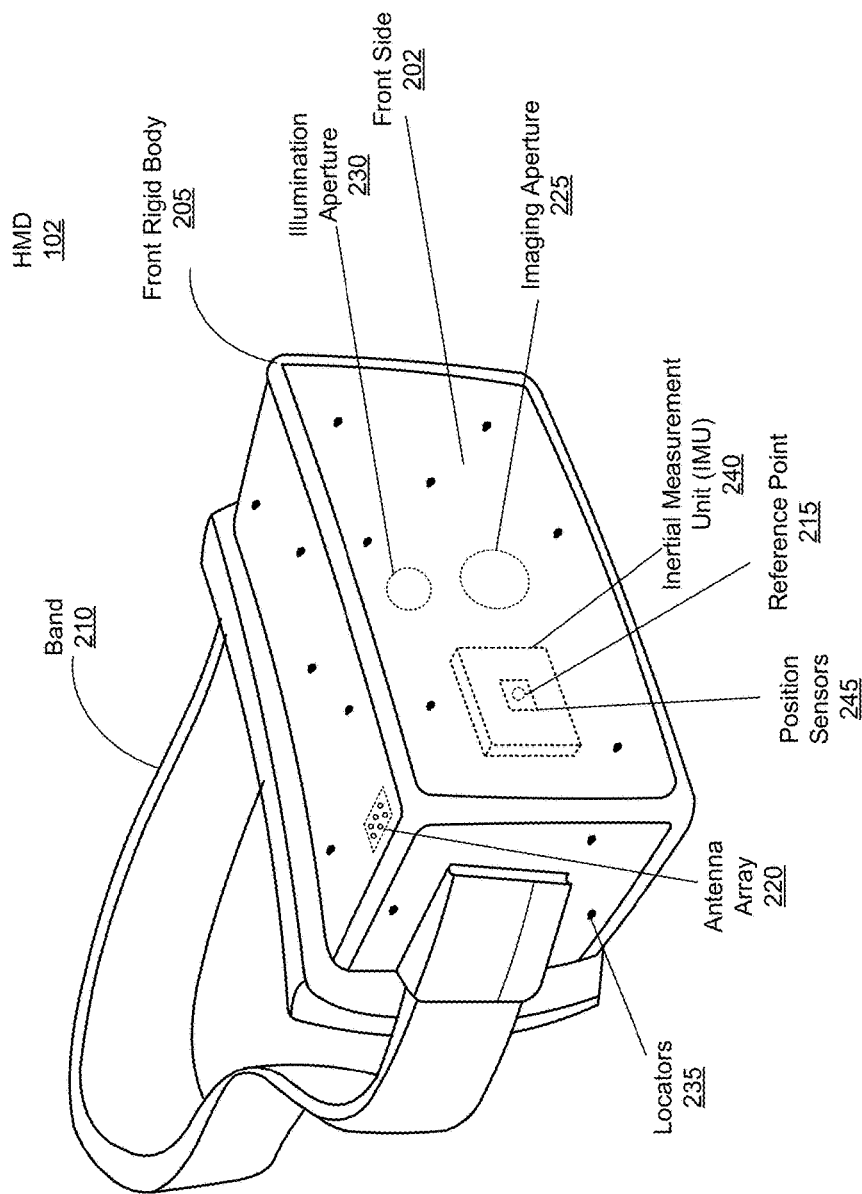
FIG. 2 is a detailed diagram of the HMD of FIG. 1, in accordance with an embodiment.

FIG. 2 is a detailed diagram of the HMD 102 of FIG. 1, in accordance with an embodiment. Portions of a front side 202 of the HMD 102 are at least partially transparent in the visible band (~380 nm to 750 nm), and portions of the HMD 102 that are between the front side 202 of the HMD 102 and an eye of the user are at least partially transparent (e.g., a partially transparent electronic display). The HMD 102 includes a front rigid body 205, a band 210, a reference point 215, and an antenna array 220. In some embodiments, the antenna array 220 integrated into the front rigid body 205 comprises multiple phased-array antennas, which may be used for wireless communication with the console 104 based on beam forming. The HMD 102 wirelessly communicates with the console 104 in different beam directions using the phased-array antennas of the antenna array 220. In alternate embodiments, the antenna array 220 comprises one or more omnidirectional antennas configured to cover different regions of space, i.e., sectors and/or beams, to achieve beam forming communication between the HMD 102 and the console 104.

In some embodiments, the HMD 102 also includes a depth camera assembly (DCA) configured to determine depth information of a local area surrounding some or all of the HMD 102. In these embodiments, the HMD 102 includes an imaging aperture 225 and an illumination aperture 230, and an illumination source of the DCA would emit light (e.g., structured light) through the illumination aperture 230. An imaging device of the DCA would capture light from the illumination source that is reflected/scattered from the local area through the imaging aperture 225. In some embodiments, the HMD 102 also includes one or more locators 235. The locators 235 are objects located in specific positions on the HMD 102 relative to one another and relative to the reference point 215. A locator 235 may be a light emitting diode (LED), a corner cube reflector, a reflective marker, a type of light source that contrasts with an environment in which the HMD 102 operates, or some combination thereof.

In one embodiment, the front rigid body 205 includes one or more electronic display elements, one or more integrated eye tracking systems, an Inertial Measurement Unit (IMU) 240, one or more position sensors 245, and the reference point 215. The position sensors 245 may be located within the IMU 240, and neither the IMU 240 nor the position sensors 245 are visible to a user of the HMD 102. The IMU 240 is an electronic device that generates fast calibration data based on measurement signals received from one or more of the position sensors 245. A position sensor 245 generates one or more measurement signals in response to motion of the HMD 102. Examples of position sensors 245 include: one or more accelerometers, one or more gyroscopes, one or more magnetometers, another suitable type of sensor that detects motion, a type of sensor used for error correction of the IMU 240, or some combination thereof. The position sensors 245 may be located external to the IMU 240, internal to the IMU 240, or some combination thereof.

In some embodiments, the HMD 102 utilizes measurement data obtained from at least one of: the DCA, the locators 235, the IMU 240 and the position sensors 245 to determine and track a position and/or orientation of the HMD 102 relative to a specific reference point on the console that wirelessly communicates with the HMD 102. The HMD 102 may include one or more processors (not shown in FIG. 1) configured to translate the determined and tracked relative position of the HMD 102 into information about a preferred direction for a transmission beam for wireless communication with the console 104. In one or more embodiments, the antenna array 220 may use the transmission beam with the preferred direction to communicate over a wireless link with the console 104.

Referring back to FIG. 1, the console 104 provides content to the HMD 102 for processing and/or display. In one embodiment, the console 104 receives position information, acceleration information, velocity information, predicted future positions, or some combination thereof, of the HMD 102. Based on the received information, the console 104 determines content to provide to the HMD 102 for presentation to the user. For example, if the received information indicates that the user has looked to the left, the console 104 generates content for the HMD 102 that mirrors the user's movement in a virtual environment or in an environment augmenting the local area with additional content. Additionally, the console 104 executes one or more applications and may provide feedback to a user related to the execution of the applications. The feedback may be visual or audible feedback via the HMD 102 or haptic feedback.

As discussed above, the console 104 and the HMD 102 communicate wirelessly. In one embodiment, the console 104 uses at least one wide beam (i.e., tapering) to communicate with the HMD 102. The wide beam alleviates the requirement for beam tracking at the console 104. In an alternate embodiment, the console 104 may use a narrow beam when wirelessly communicating with the HMD 102. In contrast, the HMD 102 uses a narrow beam to maintain link gain when wirelessly communicating with the console 104.

The HMD 102 performs beam training to identify a beam over which packets of data may be wirelessly communicated between the HMD 102 and the console 104. For example, the HMD 102 transmits a data packet to the console 104 using a first directional narrow beam of a plurality of directional narrow beams of the HMD 102. During transmission of the data packet, a user of the HMD may move relative to a specific reference point on the console 104. Before switching a directional narrow beam for communication with the console 104, the HMD 102 may perform beam training in order to determine a preferred directional narrow beam for wireless communication with the console 104.

In some embodiments, the HMD 102 performs beam training by employing beam level sweep during a beam training period when the HMD 102 transmits packets $315_1$, $315_2$, . . . , $315_N$ to the console 104 using various directional narrow beams. The console 104 receives the packets $315_1$, $315_2$, . . . , $315_N$ transmitted using different directional narrow beams and sends feedback to the HMD 102 indicating a preferred directional narrow beam that provides a best link quality among the different directional narrow beams. Based on the feedback, the HMD 102 determines a new preferred directional narrow beam for communication with the console, which ensures that a quality of communication link between the HMD 102 and the console 104 is above a predetermined threshold value.

As the user of the HMD 102 moves relative to the console 104, there may be degradation in the quality of communication link between the HMD 102 and the console 104. A low quality of communication link also causes a data rate lower than a minimum threshold and loss of packets between the HMD 102 and the console 104. The degradation in the quality of the communication link may be detected by the HMD 102 or the console 104. In some embodiments, in addition to a lower data rate or loss of packets, the degradation in the quality of the communication link may be detected based on other system information, such as the HMD 102 using an edge beam of the directional narrow beams to communicate with the console 104.

The HMD 102 may repeatedly perform beam training in order to determine a new preferred directional narrow beam for wireless communication with the console 104 when the quality of the communication link between the HMD 102 and the console 104 degrades. In some cases, the position of the HMD 102 relative to the console 104 is such that a high quality communication link between the HMD 102 and the console 104 cannot be formed. In the illustration in FIG. 1, the HMD 102, at position A, can form a high quality communication link with the console 104, but, at position B, can no longer form a high quality communication link because of the directionality of the HMD 102 at position B. When a high quality communication link cannot be formed between the HMD 102 and the console 104, the HMD 102 may attempt to communicate with the console 104 via the relay 106.

The relay 106 is a device that operates as an intermediary between the HMD 102 and the console 104 when the HMD 102 and the console 104 are not able to form a direct high quality communications link. In one embodiment, the system environment 100 may be configured with multiple relays 106 to improve the overall quality of the wireless communication as the HMD 102 moves around the environment. In one embodiment, the relay 106 includes a digital signal processing (DSP) core for time-syncing with a transceiver in the console 104. The time-syncing enables the relay 106 to determine the overall timing of the wireless communications between the relay 106 and the console 104 and, more specifically, the beacon intervals. In other embodiments, the timing information may be determined using an out-of-band method, for example, Bluetooth; thus, the DSP core is not needed to perform time-syncing.

The relay 106 includes at least two antennas or antenna arrays (or a combination thereof)—one antenna or antenna array facing the console 104 and one antenna or antenna array facing a possible direction of the HMD 102. The antenna or antenna array facing the console 104 may be manually tuned (for example, using a gimbal) or a beam training process may be performed between the relay 106 and the console 104 when the relay is installed into the system environment 100. In one embodiment, the relay 106 uses two antenna arrays to communicate with the console 104—one antenna array for transmitting data packets and one antenna array for receiving data packets. Similarly, the relay 106 uses two antenna arrays to communicate with the HMD 102—one antenna array for transmitting data packets and one antenna array for receiving data packets. In an alternative embodiment, the relay 106 uses one antenna array to communicate with the console 104 for both receiving and transmitting data packets. Similarly, the relay 106 uses one antenna array to communicate with the HMD 102 for both receiving and transmitting data packets. In such an embodiment, the relay includes a DSP core to switch between receiving and transmitting data packets on the antenna array.

To communicate with the HMD 102 and the console 104 via the antenna or antenna arrays, the relay 106 includes a radio-frequency (RF) circuit that enables bi-directional receive, amplify, and forward functionality of data packets being transmitted between the console 104 and the HMD 102. Further, the relay 106 uses dual band or dual polarization for connecting and communicating with the console 104 and the HMD 102. In particular, the relay 106 connects with the console 104 via a first band or a first polarization and connects with the HMD 102 via a second band or a second polarization. In one embodiment, the HMD 102 uses the first band or a first polarization to connect with the console 104 when the relay is switched off. When the relay 106 is switched on, the HMD 102 uses second band or second polarization to connect with the relay 106, and the relay 106 uses the first band or the first polarization to connect with the console 104.

To enable the seamless transition of communication between the HMD 102, the console 104, and the relay 106, at least the following steps are performed: (1) identifying a degradation in the quality of the communication link between the HMD 102 and the console 104, (2) switching communications to/from the HMD 102 to the relay 106 instead of the console 104 and to/from the console 104 to the relay 106 instead of the HMD 102, and (3) monitoring the quality of the communication link between the HMD 102 and the relay 106 to determine whether further switching is necessary. Details regarding these steps are discussed below.

Figure 3:
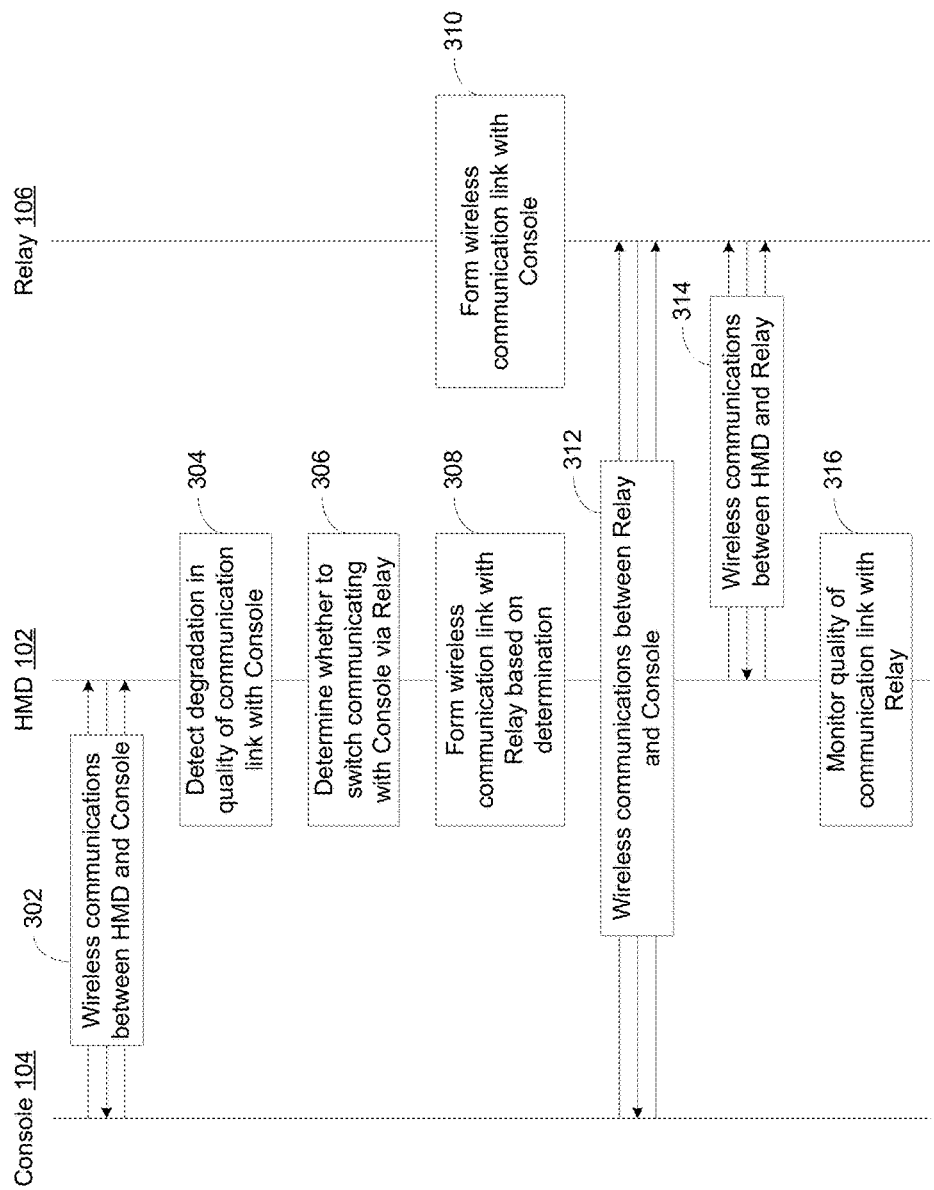
FIG. 3 is a process diagram illustrating a process of switching communications to a relay in response to communication quality degradation, in accordance with an embodiment.

FIG. 3 is a process diagram illustrating a process of switching communications to a relay in response to communication quality degradation, in accordance with an embodiment. Other embodiments may perform the steps of the process illustrated in FIG. 3 in different orders and can include different, additional and/or fewer steps. The steps of the process may be performed by any suitable entity.

At 302, the console 104 and the HMD 102 wirelessly communicate over a communication link. In operation, to create the communication link, the HMD 102 performs beam training to identify a beam over which packets of data may be wirelessly communicated between the HMD 102 and the console 104. The HMD 102 then uses the identified beam to transmit and receive data packets to/from the console 104.

At 304, the HMD 102 detects degradation in the quality of the communication link with the console 104. The degradation may be caused by the HMD 102 moving from a position where a high quality communication link to the console 104 may be formed to a position where such a link to the console 104 cannot be formed. The HMD 102 detects the degradation based on system factors such as a data rate falling below a minimum threshold, loss of data packets transmitted by the HMD 102 or the console 104 and not received by the intended recipient, and the communication link using an edge beam of a set of available beams. In alternative embodiments, the console 104, instead of the HMD 102 or in conjunction with the HMD 102, detects the degradation in the quality of the communication link.

At 306, the HMD 102 determines based on the detected degradation whether to switch to communicating with the console 104 via the relay 106. In operation, the HMD 102 determines via the beam training process discussed above whether another beam that improves the quality of wireless communication with the console 104 is available. In such a case, the HMD 102 switches to the identified beam and continues to directly communicate with the console 104. In the case where another beam that improves the quality of communication between the HMD 102 and the console 104 cannot be identified, the HMD 102 performs the beam training process to determine whether a communication link between the HMD 102 and the relay 106 can be formed. The remaining discussion focuses on the scenario where a communication link between the HMD 102 and the relay 106 can be formed.

At 308, the HMD 102 forms a wireless communication link with the relay 106. In one embodiment, the HMD 102 uses the first band or a first polarization to connect with the console 104 when the relay is switched off. When the HMD 102 switches to communicating via the relay 106, the HMD 102 uses a second band or second polarization to connect with the relay 106.

At 310, the relay 106 forms a wireless communication link with the console 104. In one embodiment, the relay 106 performs beam training to identify a beam for communicating with the console 104. In alternative embodiment, because the position of the relay 106 is fixed, beam training with the console 104 is only performed at installation and, during switching, the relay 106 uses the pre-identified beam for communicating with the console 104. The relay 106 uses the first band or the first polarization to communicate with the console 104. Because the HMD 102 and the console 104 use different bands or polarizations for communicating with the relay 106, the relay 106 can isolate transmission and receipt signals and the console 104 does not have any interference with the HMD 102.

At 312, the console 104 and the relay 106 wirelessly communicate over the communication link formed at 310. At 314, the HMD 102 and the relay 106 wirelessly communicate over the communication link formed at 308. In operation, the relay 106 forwards data packets received from the console 104 to the HMD 102 and forwards data packets received from the HMD 102 to the console 104.

At 316, the HMD 102 continues to monitor the quality of the communication link with the relay 106. In a scenario where the quality degrades, the HMD 102 may identify a different beam for communicating with the relay 106 or may switch to communicating directly with the console 104 depending on the position of the HMD 102.

In such a manner, the HMD 102 can seamlessly switch between communicating with the console 104 directly or via the relay 106. To facilitate this switching, the HMD 102 is configured with one additional integrated circuit, thus the implementation cost, in terms of power used and additional hardware, is minimized. Further, because the relay 106 communicates with the HMD 102 and the console 104 on different polarizations or bands, there is minimal interference between the communications to/from the HMD 102 and the console 104.

Countering Undesired Feedback in Relay

Figure 4:
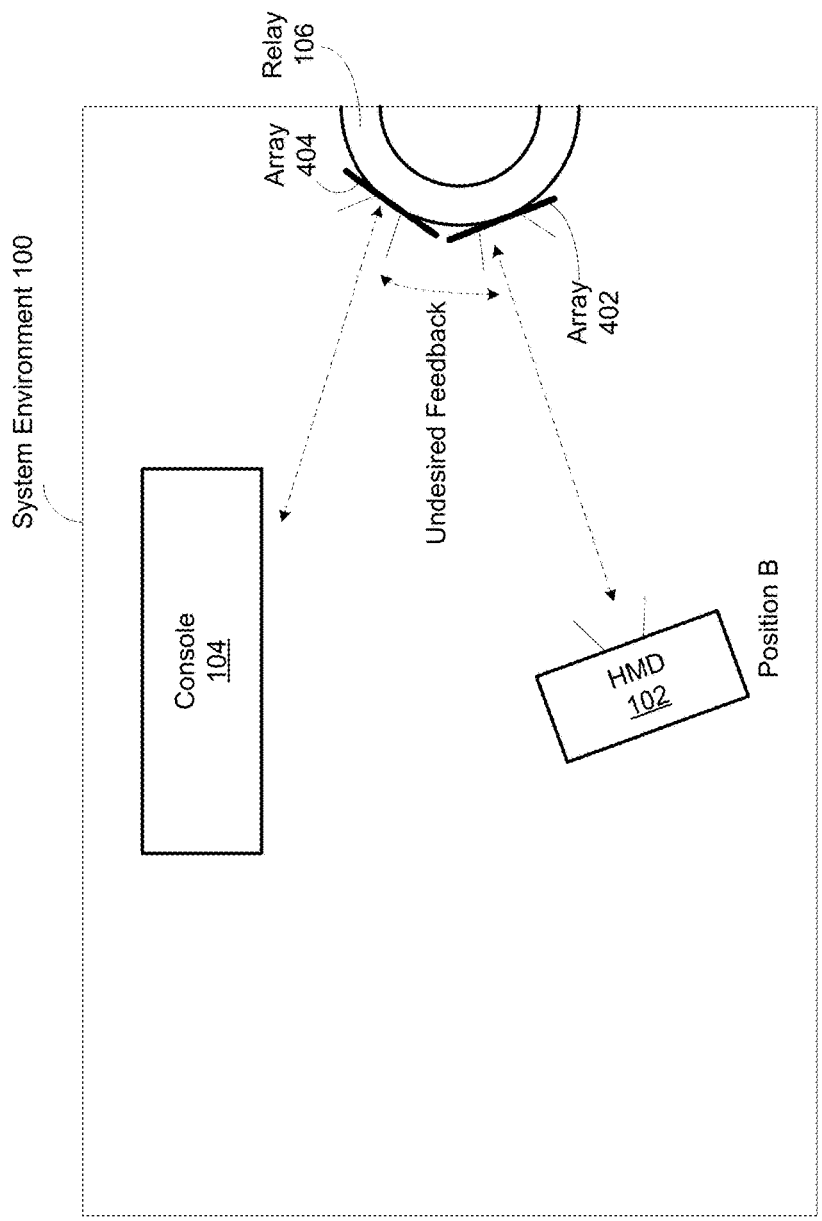
FIG. 4 illustrates a configuration of the relay with two antenna arrays, in accordance with an embodiment.

FIG. 4 illustrates a configuration of the relay 106 with two antenna arrays 402 and 404, in accordance with an embodiment. In the illustrated embodiment, the antenna array 402 is configured to communicate with the HMD 102 and the antenna array 404 is configured to communicate with the console 104. As a consequence of antenna array 402 and antenna array 404 being proximally located, there is feedback or coupling between the two antenna arrays. This feedback is undesirable because energy that should be radiated away from one of the antenna arrays 402 and 404 is absorbed by the other antenna array. Similarly, energy that could have been captured by one of the antenna arrays 402 and 404 is instead absorbed by the other antenna array. Therefore, the feedback reduces the antenna efficiency and performance of antennas in both the transmit and receive mode.

Figure 5:
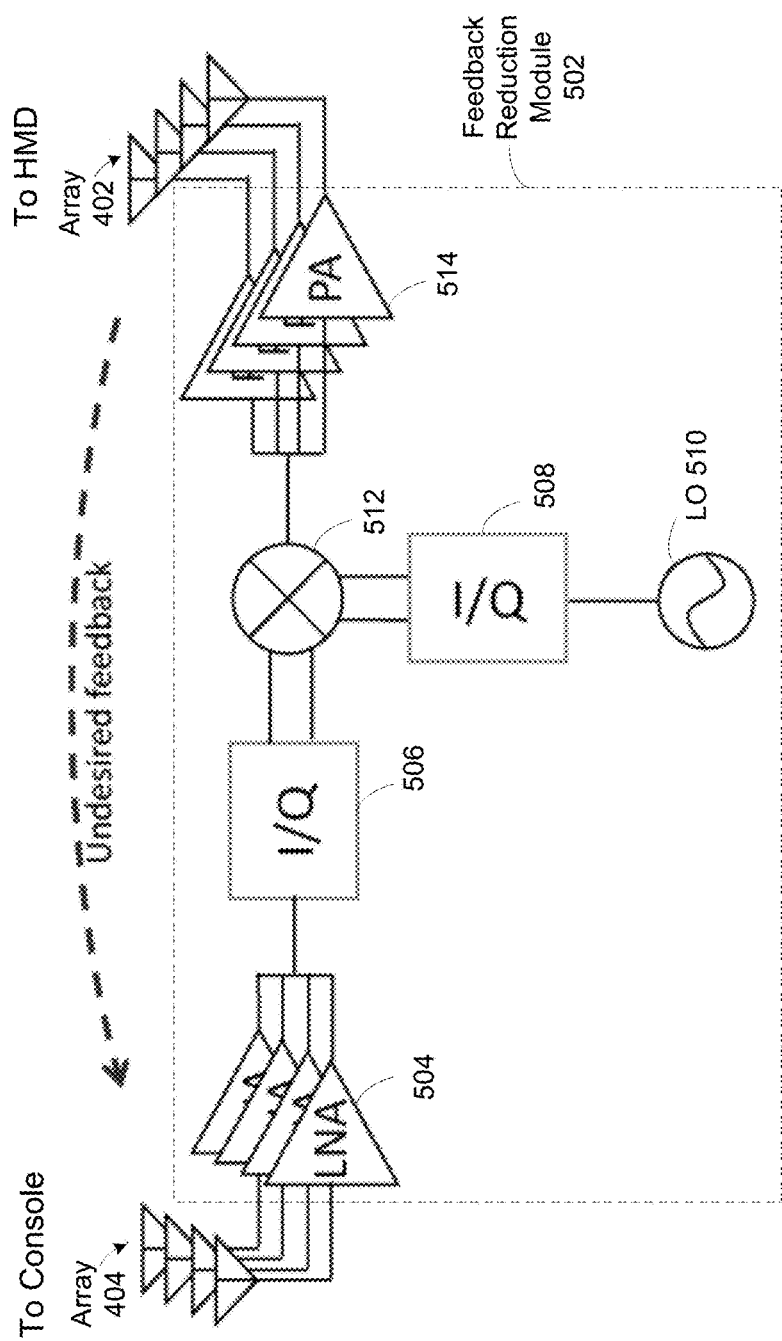
FIG. 5 illustrates a feedback reduction module coupled to the antenna arrays, in accordance with an embodiment.

FIG. 5 illustrates a feedback reduction module 502 coupled to the antenna arrays 402 and 404, in accordance with an embodiment. The feedback reduction module 502 includes a set of low noise amplifiers (LNAs) 504, an in-phase quadrature (I/Q) mixer 506, an I/Q mixer 508, a local oscillator 510, a frequency mixer 512, and a set of power amplifiers 514.

The LNAs 504 are coupled to the output of the antenna array 404, and the I/Q mixer 506 is coupled to the output of the LNA 504. The I/Q 508 is coupled to the output of the local oscillator 510. The frequency mixer 512 mixes the signals outputted by the I/Q 506 and the I/Q 508. The power amplifiers 514 are coupled to the output of the frequency mixer 512 and the antenna array 402. Implementing the I/Q mixers 506 and 508 in a such a manner, eliminates or significantly reduces the undesired feedback between the antenna arrays 402 and 404.

Figure 6:
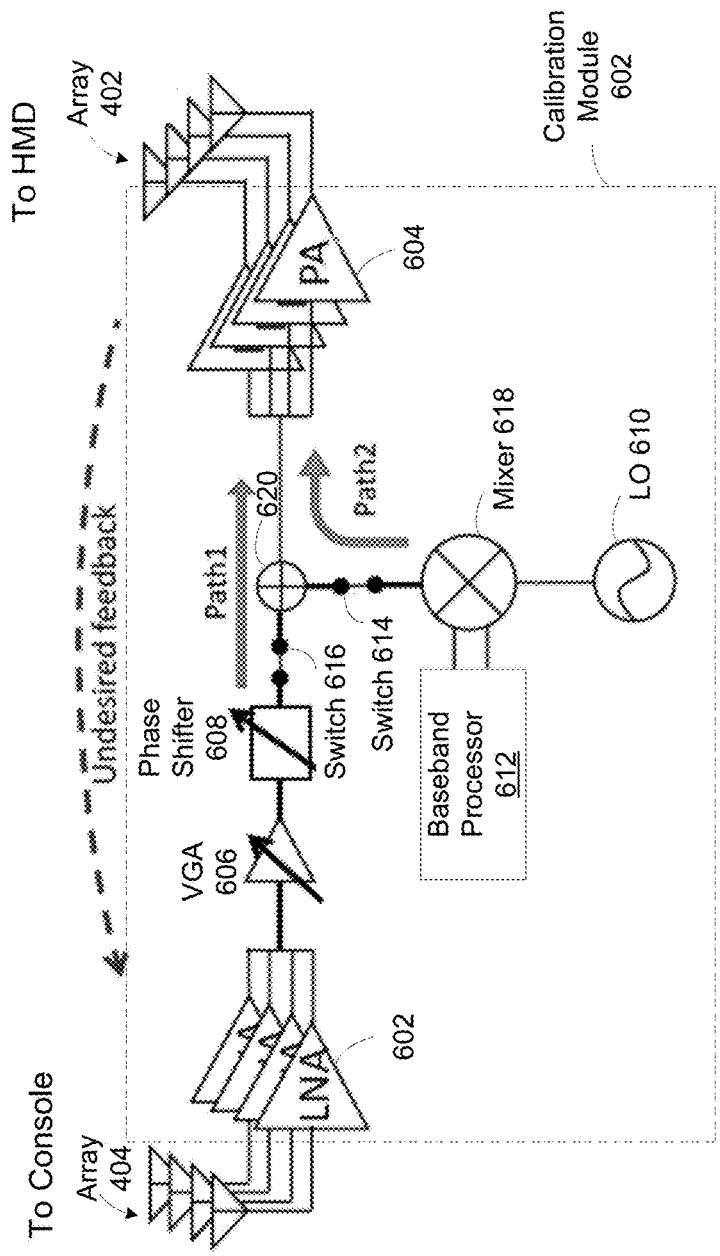
FIG. 6 illustrates a calibration module coupled to the antenna arrays, in accordance with an embodiment.

FIG. 6 illustrates a calibration module 602 coupled to the antenna arrays 402 and 404, in accordance with an embodiment. The calibration module 602 is configured to perform gain or phase calibration to eliminate undesired feedback between the antenna array 404 and the antenna array 402. The calibration is performed when the relay 106 is first installed within the system environment 100 and may be performed periodically thereafter.

The calibration module 602 includes a set of low noise amplifiers (LNAs) 602, a set of power amplifiers 604, a variable gain amplifier (VGA) 606, a phase shifter 608, a local oscillator 610, a baseband processor 612, a frequency mixer 618, a switch 616, and a switch 614, and a frequency mixer 620. The LNAs 602 are coupled to the output from the antenna array 404 and to the input of the VGA 606. The output of the VGA 606 is coupled to the phase shifter 608, and the output of the phase shifter is coupled to the switch 616. The local oscillator 610 and the baseband processor 612 are coupled to the mixer 618, which is coupled to the switch 614.

When the switch 616 is closed, path 1 between the array 404 and the array 402 is formed. When the switch 614 is closed, path 2 between the output of the mixer 618 (referred to as the single tone generator) and the array 402 is formed. When both switches are simultaneously closed, the mixer 620 combines the signal over path 1 with the signal over path 2. The set of power amplifiers 604 are configured to feedback the output power received via path 1 and/or path 2 to the baseband processor 612.

Figure 7:
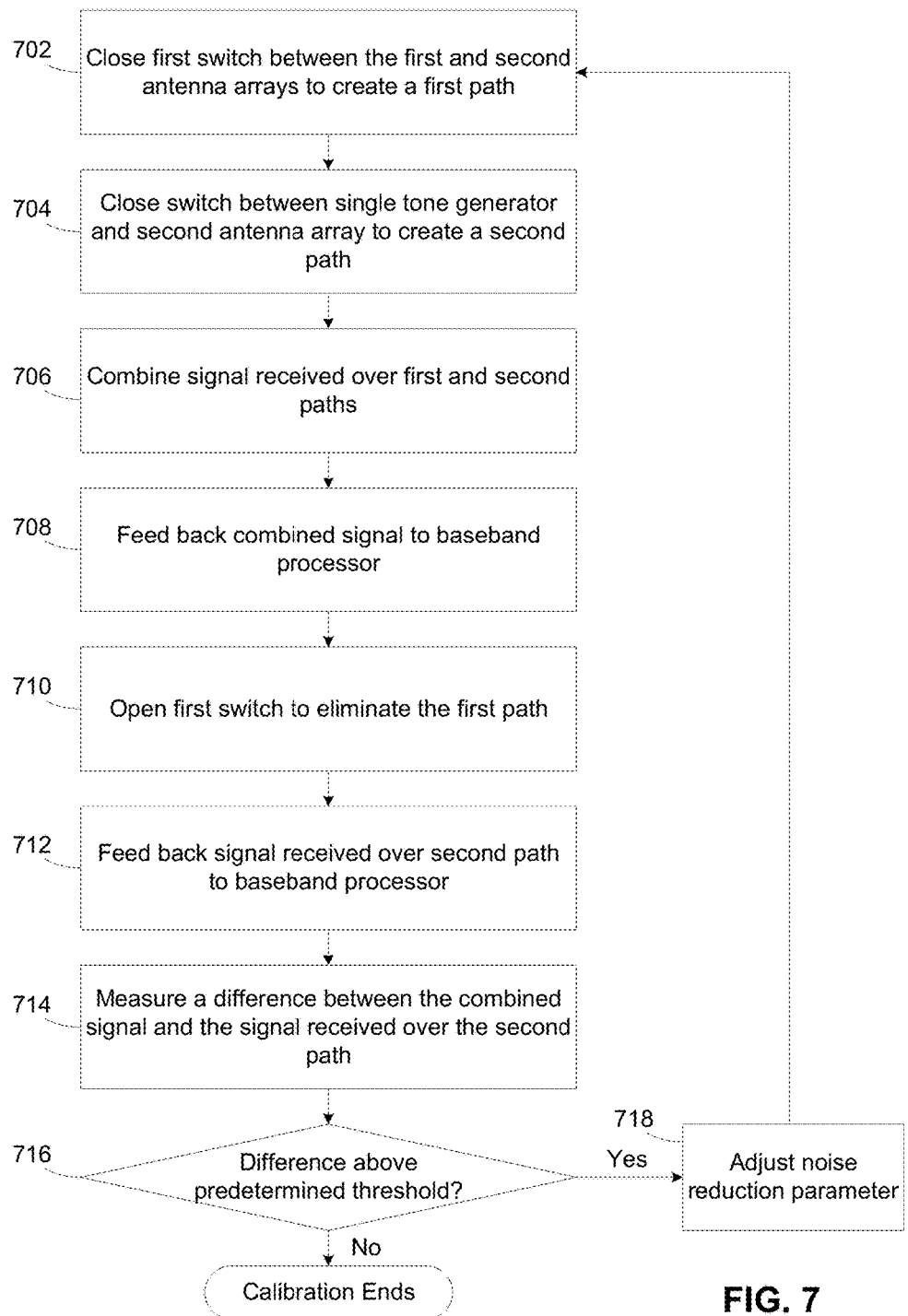
FIG. 7 is a process diagram illustrating a process for calibrating the phase or gain to eliminate undesired feedback using the calibration module, in accordance with an embodiment.

FIG. 7 is a process diagram illustrating a process for calibrating the phase or gain to eliminate undesired feedback using the calibration module 602, in accordance with an embodiment. Other embodiments may perform the steps of the process illustrated in FIG. 7 in different orders and can include different, additional and/or fewer steps. The steps of the process may be performed by any suitable entity.

At 702, the calibration module 602 closes the switch 616 between the antenna array 404 and the antenna array 402 to create a first path, i.e., path 1 illustrated in FIG. 6. At 704, the calibration module 602 closes the switch 614 between the antenna array 402 and the mixer 618 (i.e., the single tone generator) to create a second path, i.e., path 2 illustrated in FIG. 6. At 706, the calibration module 602 combines the signals received over the first and the second paths.

At 708, the calibration module 602 feeds back the combined signal to the baseband processor 612. At 710, the calibration module 602 opens the first switch to eliminate path 1. At 712, the calibration module 602 feeds back the signal received over path 2 to the baseband processor 612. At 714, the calibration module 602 (and, more specifically, the baseband processor 612) measures the difference between the combined signal and the signal received over path 2.

At 716, the calibration module 602 determines whether the difference is above a predetermined threshold. When the signal is above the pre-determined threshold, at 718, the calibration module 602 adjusts the noise reduction parameter. In operation, the noise reduction parameter may be the gain, in which case the calibration module 602 lowers the gain of the VGA 606. Alternatively, the noise reduction parameter may be the phase, in which case the calibration module 602 changes the phase of the phase shifter 608. The process then loops back to 702.

The calibration module 602 iteratively performs steps 702-718 until the difference between the signal received over only the second path and the combined signal received over the first is below or at the predetermined threshold. When the difference is below or at the predetermined threshold, the feedback between the antenna array 402 and the antenna array 404 is eliminated or sufficiently reduced and the calibration ends.

Figure 8:
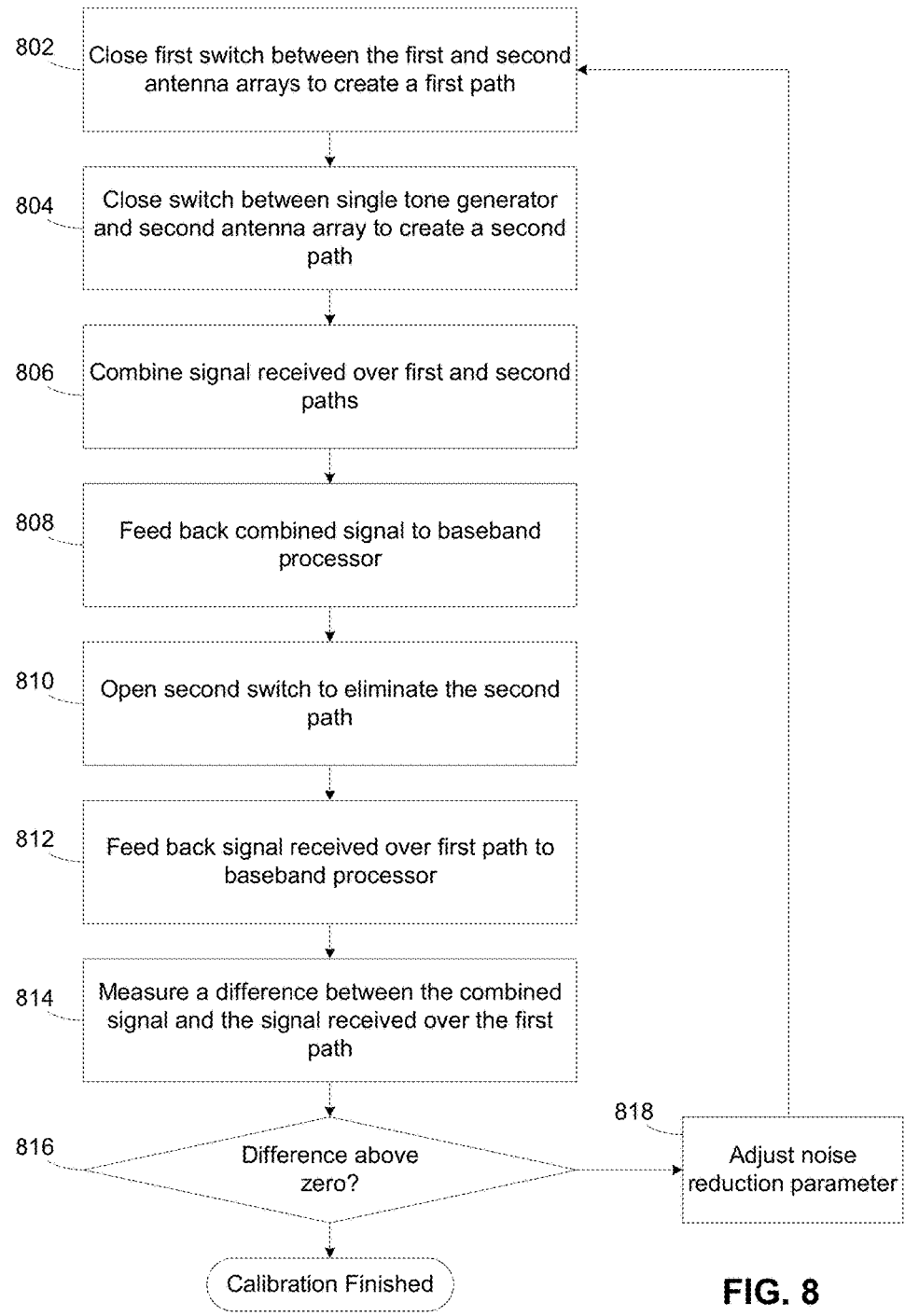
FIG. 8 is a process diagram illustrating another process for calibrating the phase or gain to eliminate undesired feedback using the calibration module, in accordance with an embodiment.

FIG. 8 is a process diagram illustrating another process for calibrating the phase or gain to eliminate undesired feedback using the calibration module 602, in accordance with an embodiment. Other embodiments may perform the steps of the process illustrated in FIG. 8 in different orders and can include different, additional and/or fewer steps. The steps of the process may be performed by any suitable entity.

At 802, the calibration module 602 closes the switch 616 between the antenna array 404 and the antenna array 402 to create a first path, i.e., path 1 illustrated in FIG. 6. At 804, the calibration module 602 closes the switch 614 between the antenna array 402 and the mixer 618 (i.e., the single tone generator) to create a second path, i.e., path 2 illustrated in FIG. 6. At 806, the calibration module 602 combines the signals received over the first and the second paths.

At 808, the calibration module 602 feeds back the combined signal to the baseband processor 612. At 810, the calibration module 602 opens the second switch to eliminate path 2. At 812, the calibration module 602 feeds back the signal received over path 1 to the baseband processor 612. At 814, the calibration module 602 (and, more specifically, the baseband processor 612) measures the difference between the combined signal and the signal received over path 1.

At 816, the calibration module 602 (and, more specifically, the baseband processor 612) determines whether the difference is above zero. When the signal is above zero, at 818, the calibration module 602 adjusts the noise reduction parameter. In operation, the noise reduction parameter may be the gain, in which case the calibration module 602 lowers the gain of the VGA 606. Alternatively, the noise reduction parameter may be the phase, in which case the calibration module 602 changes the phase of the phase shifter 608. The process then loops back to 802.

The calibration module 602 iteratively performs steps 802-818 until the difference between the signal received over only the second path and the combined signal received over the first is zero. When the difference is zero, the feedback between the antenna array 402 and the antenna array 404 is eliminated or sufficiently reduced and the calibration ends. In one embodiment, the calibration module 602 performs the calibration described above for each of the beam directions of the antenna arrays 402 and 404.

The calibration module 602 performs the calibration described above when the relay 106 is installed in the system environment 100. The calibration module 602 may continue to monitor the signal outputted by the power amplifiers 604 to determine whether further calibration is necessary during the ongoing operation of the relay 106. In some cases, temperature induced oscillation may create undesired feedback, and, therefore, the calibration module 602 may perform calibration to reduce the effects of the additional feedback.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A calibration system for calibrating a relay coupled to a console and a head mounted device, comprising:
   a first path coupling a first antenna array of the relay and a second antenna array of the relay, the first antenna array for coupling with the console and the second antenna array for coupling with the head mounted display, the first path including a variable gain amplifier;
   a second path between a single tone generator and the second antenna array,
   a frequency mixer configured to combined a first signal on the first path and a second signal on the second path to generate a combined signal;
   a baseband processor configured to measure a difference between the combined signal and the second signal, the difference between the combined signal and the second signal for controlling a gain of the variable gain amplifier.

2. The calibration system of claim 1, further comprising:
   a feedback adjusting component for adjusting a gain of the variable gain amplifier based on the difference between the combined signal and the first signal.

3. The calibration system of claim 2, wherein the feedback adjusting component comprises:
   a phase shifter, and adjusting the feedback reduction parameter comprises adjusting a phase shifter to adjust a phase parameter in the first path.

4. The calibration system of claim 2, wherein the feedback adjusting component iteratively adjusts the gain of the variable gain amplifier until the difference between the combined signal and the second signal is below a predetermined threshold.

5. The calibration system of claim 4, wherein the calibration system further includes:
   a power amplifier or a power detector configured to feed back a power level of the combined signal to the baseband processor when the first switch is open and the second switch is closed.

6. The calibration system of claim 1, wherein:
   the first path further comprises a first switch,
   the second path comprises a second switch, and
   the frequency mixer is configured to combine the first signal and the second signal when both the first switch and the second switch are closed.

7. The calibration system of claim 6, wherein the power amplifier or the power detector is configured to feed back a power level of the first signal to the baseband processor when the first switch is closed and the second switch is open.

8. A method comprising:
   closing a first switch coupling a first antenna array and a second antenna array to form a first signal path;
   closing a second switch coupling a tone generator and the second antenna array;
   combining a first signal on the first signal path and a second signal on the second signal path to generate a combined signal;
   receiving the combined signal at a baseband processor;
   open the first switch to eliminate the first path;
   receive the second signal at the baseband processor; and
   adjusting a feedback reduction parameter based on the received combined signal and the received second signal.

9. The method of claim 8, wherein adjusting the feedback reduction parameter comprises:
   measuring a difference between the combined signal and the second signal,
   determining that the difference is above a predetermined threshold, the predetermined threshold representing an acceptable measure of feedback generated by the coupling between the first antenna array and the second antenna array, and
   responsive to determining that the difference is above the predetermined threshold, adjusting a feedback reduction parameter.

10. The method of claim 9, wherein measuring the difference comprises:
    comparing a power level of the combined signal with a power level of the first signal.

11. The method of claim 9, wherein the predetermined threshold is zero.

12. The method of claim 8, wherein adjusting the feedback reduction parameter comprises adjusting a variable gain amplifier to lower a gain parameter in the first signal path.

13. The method of claim 8, wherein adjusting the feedback reduction parameter comprises adjusting a phase shifter to adjust a phase parameter in the first signal path.

14. The method of claim 8, wherein the first antenna array is coupled to a console, and the second antenna array is coupled to a head mounted device.

15. A method comprising:
    closing a first switch coupling a first antenna array and a second antenna array to form a first signal path;
    closing a second switch coupling a tone generator and the second antenna array;
    combining a first signal on the first signal path and a second signal on the second signal path to generate a combined signal;
    receiving the combined signal at a baseband processor;
    open the second switch to eliminate the second path;
    receive the first signal at the baseband processor; and
    adjusting a feedback reduction parameter based on the received combined signal and the received first signal.

16. The method of claim 15, wherein adjusting the feedback reduction parameter comprises:
    measuring a difference between the combined signal and the first signal,
    determining that the difference is above a predetermined threshold, the predetermined threshold representing an acceptable measure of feedback generated by the coupling between the first antenna array and the second antenna array, and responsive to determining that the difference is above the predetermined threshold, adjusting a feedback reduction parameter.

17. The method of claim 16, wherein measuring the difference comprises:

comparing a power level of the combined signal with a power level of the first signal.

18. The method of claim 15, wherein adjusting the feedback reduction parameter comprises adjusting a variable gain amplifier to lower a gain parameter in the first signal path.

19. The method of claim 15, wherein adjusting the feedback reduction parameter comprises adjusting a phase shifter to adjust a phase parameter in the first signal path.

20. The method of claim 15, wherein the first antenna array is coupled to a console, and the second antenna array is coupled to a head mounted device.

* * * * *

UNITED STATES PATENT AND TRADEMARK OFFICE
CERTIFICATE OF CORRECTION

PATENT NO. : 10,110,330 B1
APPLICATION NO. : 15/917436
DATED : October 23, 2018
INVENTOR(S) : Hongyu Zhou, Qi Qu and Ganesh Venkatraman Page 1 of 1

It is certified that error appears in the above-identified patent and that said Letters Patent is hereby corrected as shown below:

On the Title Page

Item [57], delete "and the console may degrades", and insert -- and the console may degrade --

Signed and Sealed this
Eighteenth Day of June, 2019

Andrei Iancu
*Director of the United States Patent and Trademark Office*